July 16, 1946. A. LICHT Re 22,771
BRASSIERE
Original Filed Sept. 21, 1943
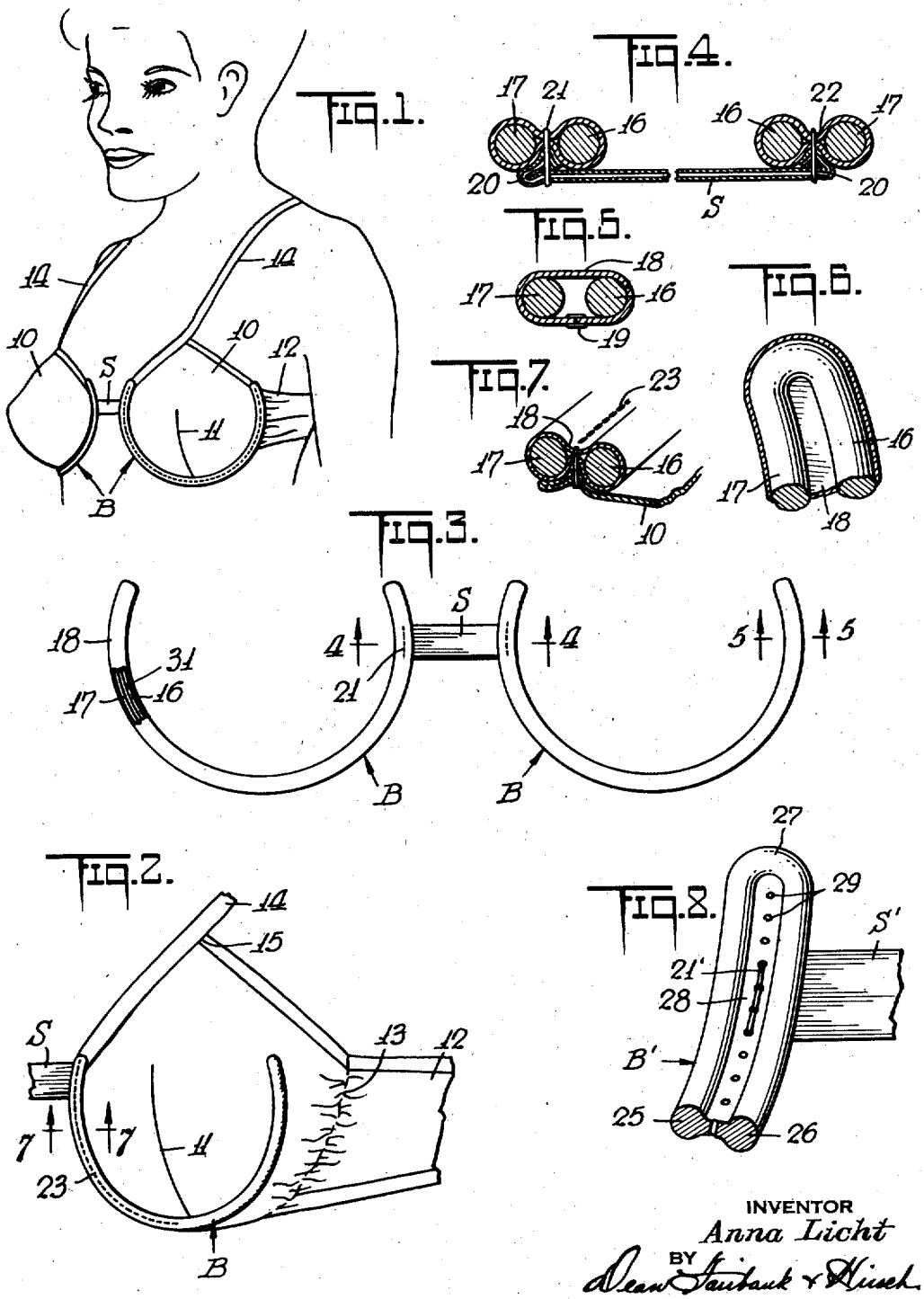
INVENTOR
Anna Licht
BY
Dean Faubank & Hirsch
ATTORNEYS Reissued July 16, 1946

Re. 22,771

UNITED STATES PATENT OFFICE 22,771

BRASSIÈRE

Anna Licht, New York, N. Y.

Original No. 2,380,978, dated August 7, 1945, Serial No. 503,181, September 21, 1943. Application for reissue April 18, 1946, Serial No. 663,022

16 Claims. (Cl. 2—42)

It is among the objects of the invention to provide a well fitting cup-type brassière which affords complete support for the bust without pressure or harness-like confinement and permits freedom of movement and of chest expansion without discomfort and without strain upon the garment.

Another object is to provide a simple, inexpensive accessory device that can readily be attached to a cup brassière of any conventional construction to afford the advantages above referred to.

In the accompanying drawing in which are shown one or more of various possible embodiments of the several features of the invention.

Fig. 1 is a perspective view showing the garment as worn,

Fig. 2 is a fragmentary perspective view thereof on a larger scale with only part of the brace attached, Fig. 3 is a front elevation of the attachment unit, Fig. 4 is a transverse sectional view on a larger scale taken on line 4—4 of Fig. 3, Fig. 5 is a transverse sectional view on a larger scale taken on line 5—5 of Fig. 3, Fig. 6 is a fragmentary view of the wire brace, with one face of the sheath removed.

Fig. 7 is a transverse sectional view on a larger scale taken on line 7—7 of Fig. 2 and showing a fragment of the attached brace in perspective, and Fig. 8 is a fragmentary perspective view partly in section of an alternative form of brace.

Referring now to the drawing, the conventional cup-type brassière illustratively shown includes a pair of fabric pieces 10 plaited as at 11 to afford the desired cup concavity. In the conventional garment the brassière extends about the body, lateral straps 12 connected to the cups at 13 being releasably connected in any desired manner (not shown) at the back of the wearer. In addition, the conventional brassière has shoulder straps 14 connecting the upper or peaked portions 15 of the cups to the free rear ends (not shown) of the straps 12. The cups in the conventional construction are attached together by any of a wide variety of connectors.

According to the present invention the lower rim of each cup has an arcuate, preferably a generally semi-circular brace B attached thereto, and said braces are desirably directly connected together at their adjacent ends by a short elastic strap S which also serves as the connector between the two cups.

Preferably, the two arcuate braces B and their connecting elastic strap S are preassembled as a unit and attached as such to the brassière cups to serve as the brace therefor and the connector therebetween. Preferably, also, the arcuate brace is so formed as to afford convenience for guiding a line of stitching along and through the same.

In one preferred embodiment shown in Figs. 3, 4 and 5 each brace is made of a pair of stiffeners, preferably adjacent wire lengths 16 and 17 enclosed in a fabric sheath 18 which completely houses their lengths as well as their ends. That sheath may be made of a piece of fabric stitched together at one face as at 19. As shown in Fig. 6 the brace is desirably made of a single length of wire reversely bent to form hairpin turns at the opposite ends of the brace, the abutting extremities of the wire being soldered, brazed or welded together as at 31. The rounded hairpin turns afford a brace with smooth rounded ends, and the continuous loop of metal is of arcuate form and its two wire lengths lie in a common plane with the convexity of the inner length nested and slightly spaced from the concavity of the outer length.

The sheath in each embodiment would, of course, be made of color and fabric corresponding to that of the brassière itself or contrasting therewith according to any desired color scheme or design. The connecting elastic strap S is desirably reversely bent at its ends 20 and stitched to the braces by a line of stitching 21 extending through the fabric sheath 18 and indenting the same between the wires as shown at 22.

It will be obvious that the unit shown in Fig. 3 can be conveniently attached to form the border of or to frame the lower rim of the brassière cups by a median line of longitudinal stitching as at 23. As best shown in Fig. 7 the line of machine or hand stitching is guided by the wire lengths 16 and 17 to run through the sheath 18 midway therebetween and to conform to the concavity between said wires.

While the brassière may be made and marketed by the manufacturer as above disclosed, one important application of the invention is to market the brace and elastic connector unit shown in Figs. 3, 4 and 5 as a brassière attachment for application to the conventional unbraced brassière by the ultimate consumer. Three sizes of such brassière attachment, large, medium and small are sufficient for fitting all but exceptional wearers. The connection between the two cups might be readily cut off by the wearer as might also, if desired, any excess material beyond or below the cups of the brassière, as usually made. The unit shown in Figs. 3, 4 and 5 could then readily be stitched in place about the outer face of the lower rim of the respective cups 10 by hand or by machine to complete the assembly. Prior to such stitching operation, the wearer might put on the brassière and draw the bust line thereon with a pencil and the curvature of the braces might readily be conformed to said pencil lines in order to provide a garment that compares favorably with a costly custom-made and fitted brassière.

In use, the arcuate braces rest comfortably and snugly against the thorax, immediately below the breasts and are yieldingly held in place by the connecting elastic strap S. The cups 10 are therefore adequately braced to support, while conforming to the natural rotundity of the breasts, without pressure or discomfort. The elastic connecting strap S yields readily to stretching movement and to chest expansion of the wearer without the least binding or discomfort.

In use, the two naked nested spaced wire lengths of each wire brace within the sheath therefor, are inherently kept in a common plane in all settings thereof, and the pressure exerted thereby against the body is distributed over so wide an area as to preclude any discomfort or injury to the tender tissue under the breast. Thus, there is avoided the need for relatively bulky and costly textile or rubber buffers to protect the body from the excessive pressure that would be incurred in wear were but a single length of wire used for each brace.

In the alternative embodiment shown in Fig. 8 the encased metal brace is replaced by one of suitable plastic which may be made in any desired color and so requires no covering. The plastic strip B′ comprises a rounded rim extending the entire length of the inner or concave edge 25, and the outer or convex edge 26 as well as the ends 27. The rounded rim encompasses a unitary central web 28 the length of which has small perforations 29 therethrough along its middle, which serve for stitching thereto the elastic connecting strap S′ and for stitching the brace in place to frame the lower rim of the cup. Obviously, the plastic brace B′ might be made of suitable color to match or contrast with that of the garment or, alternatively, it might be made of transparent or translucent plastic such as "Lucite" which affords a particularly attractive effect by exposing to view the color and design of the underlying fabric.

Like the companion form, the present embodiment may be built into the garment as sold, or it may be applied by the ultimate consumer as a separate attachment and may be conformed to the bust line in the manner above described.

As many changes could be made in the above article and many apparently widely different embodiments of this invention could be made without departing from the scope of the claims, it is intended that all matter contained in the above description or shown in the accompanying drawing shall be interpreted as illustrative and not in a limiting sense.

Having thus described my invention what I claim as new and desire to secure by Letters Patent of the United States is:

1. A brassière of the cup-type comprising arcuate fabric-sheathed stiffening braces, each having a relatively unobstructed longitudinal median passage through the sheaths flanked by elements of said stiffening braces, stitching across said passage connecting the braces to the lower rims of the respective cups, and a strap intervening between the two sheathed braces and secured thereto at its ends.

2. A brassière of the cup-type comprising arcuate fabric-sheathed braces, each brace comprising a pair of adjacent curved stiffeners and stitching through said fabric sheath and extending between said stiffeners and connecting the braces to frame the lower rim of each of the cups.

3. A brassière of the cup-type, comprising arcuate fabric-sheathed braces, each of said braces comprising a pair of adjacent curved wires, stitching through the fabric sheath and between the wires of each brace and connecting the braces to the lower rims of the respective cups and a rubber elastic strap intervening between the two sheathed braces and stitched thereto at its ends.

4. A brassière of the cup-type having braces arcuate in form framing the lower rim of each cup and directly secured thereto for substantially the whole length of said braces and a strap arranged between and directly connecting substantially parallel parts of the inner end portions of said braces.

5. A brassière of the cup-type having braces arcuate in form framing the lower rim of each cup, each of said braces consisting of a wire in the form of a narrow, naked loop comprising two lengths with connecting hairpin turns at the opposite ends of the loop, the convexity of one length of the wire nesting in the concavity of the other, the brassière cups having arcuate fabric sheaths along the lower rims thereof enclosing the respective wire braces.

6. A brassière, comprising brassière cups uncovered plastic braces arcuate in form, each of said braces having transverse apertures and being stitched through said apertures and cups, to frame the outer surface of the lower rim of each of said cups, and a strap intervening between and secured at its ends to said plastic braces.

7. The combination recited in claim 6 in which each plastic brace includes a rounded rim and a flat portion with the transverse perforations.

8. As an article of manufacture, an attachment unit for a conventional cup brassière, said attachment comprising a pair of arcuate stiffening braces adapted to overlie the lower rim of the respective cups, said braces being connected near their inner ends by a short strap said stiffening braces each having stitch passageways therethrough along a line longitudinally between the lateral edges thereof.

9. As an article of manufacture, an attachment unit for a conventional brassière cup, said attachment comprising an arcuate brace, a fabric sheath therefor, said brace being arranged to afford a relatively unobstructed median stitching passage therethrough along the length thereof for facility of attachment to the lower rim of a brassière cup.

10. As an article of manufacture, an attachment unit for a conventional cup brassière, said attachment comprising a pair of generally semicircular fabric-sheathed braces, said braces being arranged to afford a relatively unobstructed median stitching passage therethrough along the length thereof, for facility of attachment to the lower rim of brassière cups, and a short rubber elastic strap stitched at its ends to near the inner ends of the respective braces.

11. As an article of manufacture, an attachment unit for a conventional cup brassière, said unit comprising a pair of braces, each of said braces comprising a pair of adjacent generally semicircular wires and a fabric sheath for each of said pairs of wires completely encasing the same, whereby the wires of each brace afford a guide passage therebetween through the fabric sheath for convenience in stitching the same to the lower rims of the cups of a brassière, and an elastic connecting strap stitched at its ends to the fabric sheaths by a line of stitching therethrough between the component wires of each brace.

12. As an article of manufacture, an attachment unit for a conventional cup brassière, said unit including a brace comprising a length of wire having hairpin turns at its opposite ends, having its extremities abutting and secured together in a continuous loop, said braces being arcuate in form with the convexity of one length thereof nested in the concavity of the other, a fabric sheath for said closed arcuate wire loop completely encasing the same, whereby the brace affords a guide passage through the fabric sheath between the constituent lengths of wire for convenience in stitching the same to the lower rim of a brassière cup.

13. As an article of manufacture, a brace structure for a cup brassière, said structure consisting of wire with abutting extremities secured together in a continuous narrow, naked loop, comprising two lengths of wire with connecting hairpin turns at the opposite ends of the loop, said brace being arcuate in form with the convexity of one length thereof nesting in and slightly spaced from the concavity of the other.

14. A brace unit for a cup brassière, in which two of the brace structures recited in claim 13 are directly connected by a strap therebetween.

15. As an article of manufacture, an attachment unit for a conventional brassière cup, said attachment comprising a generally semicircular plastic brace having a rounded rim along the length of both the convex and the concave edge as well as along the ends thereof, and having a flat web encompassed by said rim, said web having transverse perforations therethrough for facility of stitching.

16. As an article of manufacture, an attachment assembly for a conventional cup brassière, said assembly comprising two uncovered plastic members of the construction recited in claim 15, and a short elastic strap stitched at its ends to portions near the ends of the respective braces.

ANNA LICHT.